United States Patent [19]

Corsette

[11] 4,286,736

[45] Sep. 1, 1981

[54] LIQUID DISPENSER

[75] Inventor: Douglas F. Corsette, Los Angeles, Calif.

[73] Assignee: Diamond International Corporation, New York, N.Y.

[21] Appl. No.: 123,168

[22] Filed: Feb. 20, 1980

[51] Int. Cl.[3] .................... G01F 11/04

[52] U.S. Cl. .................... 222/321; 222/153; 222/384; 239/333; 220/260; 220/306

[58] Field of Search .................... 220/260, 281, 306; 239/333; 215/295; 222/320, 321, 322, 384, 153

[56] References Cited

U.S. PATENT DOCUMENTS

| | | | |
|---|---|---|---|
| 2,069,075 | 6/1951 | Lunn . | |
| 2,956,509 | 10/1960 | Cooprider et al. . | |
| 3,053,459 | 9/1962 | Corsette | 239/333 |
| 3,084,873 | 4/1963 | Corsette . | |
| 3,128,018 | 4/1964 | Corsette et al. | 222/321 |
| 3,181,719 | 5/1965 | Schaich . | |
| 3,237,571 | 3/1966 | Corsette . | |
| 3,248,021 | 4/1966 | Corsette et al. . | |
| 3,910,444 | 10/1975 | Foster | 215/295 |
| 3,982,651 | 9/1976 | Braun et al. | 220/4 B |

*Primary Examiner*—H. Grant Skaggs

*Attorney, Agent, or Firm*—Watson, Cole, Grindle & Watson

[57] ABSTRACT

A fluid dispensing pump includes a pump plunger mounted for reciprocation in a pump cylinder, the plunger having a discharge passage extending therethrough and communicating with a discharge opening in a discharge head connected with the plunger which sealingly engages a retaining collar on a container closure during a lock-down position of the discharge head. A check valve in the discharge passage includes a cage surrounding a valve opening, and a lower end of the plunger sealingly engages a portion of the cage when in the lock-down position. The piston is arranged on the plunger to form an air space so as to prevent any hydraulic lock which would interfere with a full depression of the head into its lock-down position. The sealed locking engagement between the head and the retaining collar is capable of being unlocked by the provision of axially oriented unlocking cam faces for effecting disengagement upon relative rotation between the head and the collar.

4 Claims, 4 Drawing Figures

LIQUID DISPENSER

BACKGROUND OF THE INVENTION

This invention relates generally to an improved dispenser of the reciprocating piston type for discharging liquids from a portable container, and more particularly to such dispenser as having a feature which prevents any hydraulic lock which would interfere with a full depression of the discharge head into a lock-down position, as well as a feature which facilitates easy unlocking of a seal lock between the head and a retaining collar on the container closure.

Liquid dispensers generally of the type described herein, as including a stationary pump cylinder for direct association with a container and a reciprocable piston unit which is manipulated to effect discharge of the container contents, are known as having means provided for temporarily locking the piston against relative displacement in a position such that the dispenser is completely sealed, thereby preventing leakage from the container during shipping or storage, even though the container be inverted. U.S. Pat. Nos. 3,084,873, 3,248,021 and 3,237,571 disclose liquid dispensers having plunger lock-down means for immobilizing and retaining the plunger in a depressed position. Such means is generally in the form of co-acting threads provided on the plunger head and a collar portion of the container cap. Thus, the plunger is locked down into its depressed position by screwing down the head within the collar. And, co-acting sealing surfaces are made to interengage when the plunger is fully depressed and locked so as to effect a seal against leakage of liquid outwardly of the container from the space between the plunger and the pump cylinder. While these plunger lock-down and sealing mechanisms have generally performed satisfactorily, they are not without their shortcomings. For example, the interengaging sealing surfaces must be provided in addition to the co-acting screw threads for respectively producing a seal and a lock which require additional time and materials to achieve these intended functions. Moreover, if the container cap is threaded down on to the container neck, as in the U.S. Pat. Nos. 3,084,873 and 3,237,571 dispensers, unthreading the plunger head relative to the collar for unlocking the plunger oftentimes results in an inadvertent unthreading and loosening of the cap from the container.

In lieu of co-acting locking threads, the plunger has been maintained in a downwardly depressed immobilized position by means of a protective overcap (as in U.S. Pat. No. 2,956,509) which snaps down over the collar but which has generally proven cumbersome because of the need for such an overcap.

And, means are provided in U.S. Pat. Nos. 3,248,021 and 3,237,571 for preventing flow of liquid, when in the plunger lock-down position, past the inlet valve and outwardly through the discharge passage, or between the pump cylinder and the plunger, when the dispenser is inverted. In the former, the inlet ball valve is spring biased into a fully seated position and a lip seal on the plunger is engaged in the lock-down position, and in the latter, the lower end of an inlet valve is seated below the valve openings in the lock-down position of the plunger. In any event, with or without such anti-leakage means, the liquid dispensers of the aforedescribed types are oftentimes difficult to lock down during shipment and storage due to a hydraulic lock effect which arises especially after the pump has been primed with liquid to be dispensed. This condition renders it difficult if not impossible to fully depress the plunger into its immobilized and locked position because of the resistance from the pressurized liquid which remains in the pump cylinder.

SUMMARY OF THE INVENTION

It is therefore an object of the present invention to provide an improved dispensing pump of the type described with a view to simplifying the construction and operation by reducing the number of parts and the complexity of the design to thereby reduce the cost of manufacture while at the same time improving upon the efficiency of operation.

Another object is to provide such a dispensing pump as having a plunger lock-down feature which likewise effects a seal against leakage of liquid outwardly of the pump from the pump chamber during a lock-down condition and including an unlocking feature permitting the discharge head to be quickly and easily unlocked in readiness for the dispensing operation.

A further object of this invention is to provide such a dispensing pump as having an anti-leakage feature preventing liquid from moving past the inlet valve and into the discharge passage, as well as between the pump cylinder and the plunger, during the lock-down position of the plunger, even with the pump inverted. And, any hydraulic lock interfering with movement of the plunger into its fully depressed position during locking after the pump has been primed, is substantially avoided by the invention by the provision of at least one air space at the bottom of the pump cylinder when in the plunger lock-down position.

Other objects, advantages and novel features of the present invention will become more apparent from the following detailed description of the invention when taken in conjunction with the accompanying drawings.

DETAILED DESCRIPTION OF THE INVENTION

Figure 1:
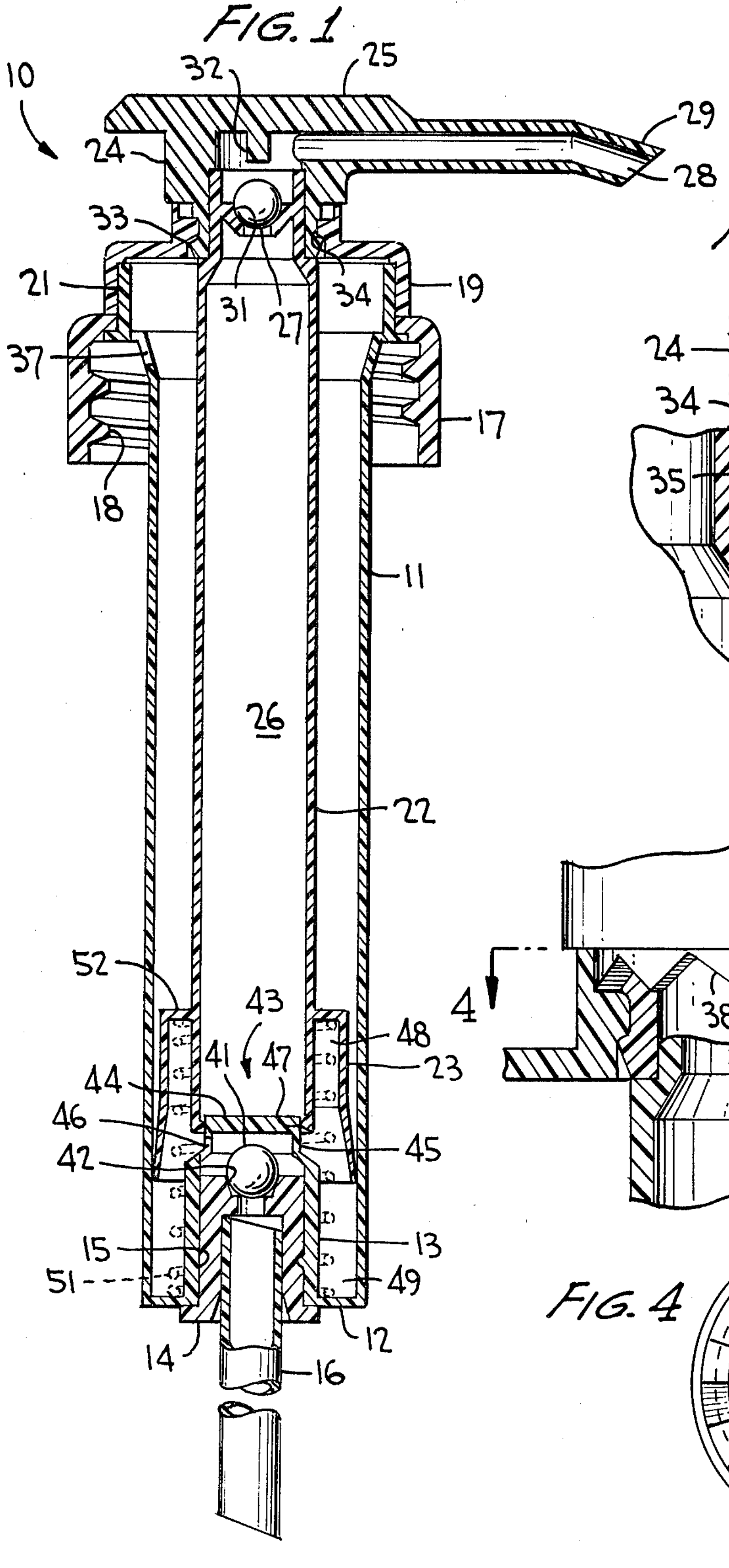
FIG. 1 is a vertical sectional view of a dispenser according to the invention, showing the plunger and discharge head locked in a fully depressed and sealed position.

Turning now to the drawings wherein like reference characters refer to like and corresponding parts throughout the several views, a liquid dispenser generally designated 10 is shown in FIG. 1 locked in a sealed position for shipping and/or storage. The dispenser comprises a cylindrical barrel or pump cylinder 11 having a bottom annular wall 12 and an internally extending inner cylindrical side wall 13 as an integral part of wall 12. A socket 14 is snuggly received within a cylindrical opening 15 formed by wall 13. A dip tube 16 is connected at its upper end to socket 14 and depends from the pump cylinder into liquid to be dispensed from a container (not shown). The pump cylinder is adapted to be affixed to the container by means of a container cap 17 secured to the upper end of cylinder 11 and having internal threads 18 adapted to engage external threads on the neck of the container. A retaining collar 19 is connected to or made an integral part of the container cap and surrounds upstanding wall portion 21 of the pump cylinder.

The dispenser further comprises a hollow cylindrical plunger 22 mounted for reciprocation within the pump cylinder and having an annular piston skirt 23 at the lower end thereof dimensioned to fit snuggly within the interior wall of pump cylinder 11. A one-piece discharge head 24 is pressed on the upper end of the plunger, the upper part of the head being formed to provide the usual finger piece 25 for depressing the plunger to pump liquid from the container.

A discharge passage 26 extends upwardly through hollow plunger 22 and discharge head 24 and communicates through a ball check valve 27 with a discharge opening 28 leading from spout 29 of the discharge head. The ball valve is seated in a valve seat 31 so that movement of liquid upwardly through the discharge passage is normally unimpeded, the valve 27 serving merely as a check valve to prevent downward movement of fluid. A stud 32, projecting downwardly from finger piece 25 of the head, serves as a retainer for ball valve 27.

Figure 2:
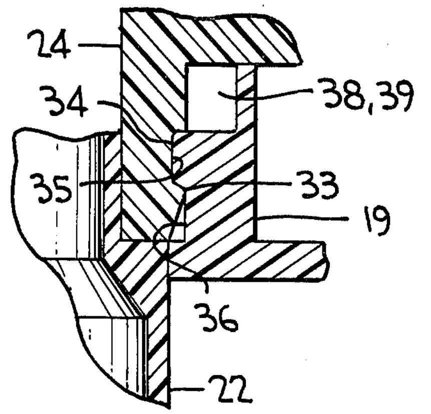
FIG. 2 is an enlarged sectional view of the locked and sealed engagement between the discharge head and the retaining collar of the container cap in the lock-down position.

The discharge head and the plunger connected thereto are immobilized and retained in the depressed position of FIG. 1 by means of co-acting annular locking and sealing rims 33, 34 respectively provided on the discharge head and on the retaining collar at such a location as to permit the discharge head to be snapped into place into the lock-down position of FIGS. 1 and 2. These rims respectfully extend into reliefs 35 and 36 provided behind the respective rims. The discharge head and interconnected plunger are therefore not only retained in the lock-down position, but the interengaged rims form a tight fluid seal preventing discharge of liquids from a container through vent opening 37 and externally of the plunger. This vent opening (only one shown although there may be more) is provided at the upper end of the pump cylinder for the purpose of preventing the formation of an air lock in the pump cylinder above the piston, to permit ingress to the container of air in order to replace discharge liquid and to allow drainage into the container of liquid which may pass the piston and which would otherwise be trapped in the upper portion of the pump cylinder.

Figure 3:
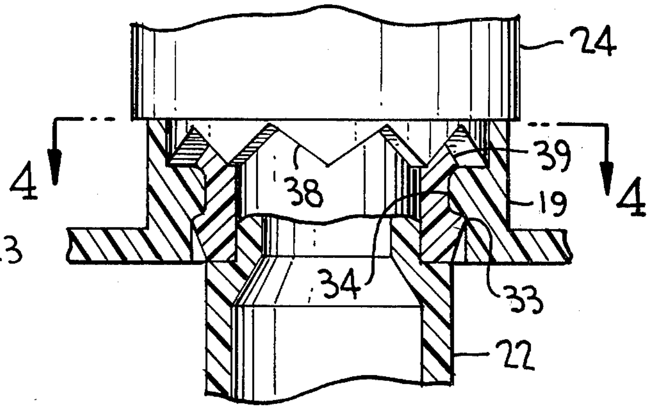
FIG. 3 is a slightly enlarged detail view in section showing the cam unlocking feature of the invention.
Figure 4:
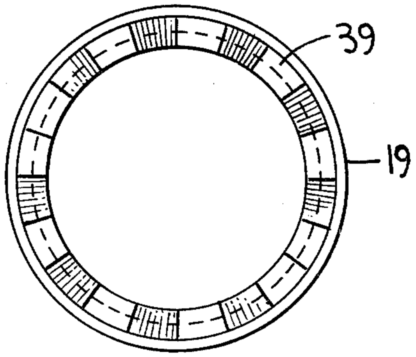
FIG. 4 is an end view of the unlocking cams of the retaining collar, taken substantially along line 4—4 of FIG. 3.

Means for quickly and efficiently unlocking the discharge head from the retaining collar so as to permit a return or upward plunger movement from that shown in FIG. 1, are provided in the form of mating V-cams 38 and 39 respectively provided on discharge head 24 and on retaining collar 19. Both sets of cams are formed by a continuous series of serations or V-shaped teeth of equal size and shape respectively depending from the plunger head and upstanding from the retaining collar. The V-cams are shown in some detail in FIGS. 3 and 4 and have an axial extent greater than the axial extent of rim 34 so that the discharge head and its connected plunger will move axially to an unlocked position upon relative rotation between the discharge head and the retaining collar. Mating cam faces, depending on the direction of relative rotation, therefore slide along one another and function to shift the discharge head and the retaining collar axially apart. Little effort is therefore required to effect unlocking and the likelihood of any loosening of container cap 17 from the neck of the container during the unlocking operation is substantially avoided.

A ball valve 41 is provided at the inlet end of the pump cylinder, and the inlet passage extending through socket 14 is provided with a valve seat 42 receiving ball valve 41. A cage 43 surrounds ball valve 41 and includes a transverse wall 44 and a surrounding side wall 45 having at least one intake port 46 therein.

The plunger is of such a length, that in the locked and sealed position of FIG. 1, its lower end telescopes over cage 43 such that an inwardly extending annular seal 47 thereon sealingly engages the exterior of side wall 45 outwardly of the intake port. Therefore, if the dispenser is inverted or laid on its side, and pressure develops in the container, for example as the result of a temperature rise, liquid trapped above the piston and within discharge passage 26 will be prevented from being forced past the piston and into the discharge passage, thereby avoiding any leakage outwardly of the passage and through discharge opening 28. The telescoping seal, as described above, is rendered operative when the plunger is in its lowermost and immobilized position. And, any passage of liquid between the pump cylinder and the plunger is prevented by the engagement between piston skirt 23 and the interior wall of cylinder 11.

As shown in FIG. 1, piston skirt 23 is spaced apart from plunger 22 and defines a first annular space 48 therewith. This annular space traps air within the upper portion thereof when the plunger is fully depressed and immobilized into its locked and sealed position of FIG. 1. Thus, even after the pump is primed, i.e., after the discharge passage is substantially filled with liquid to be dispensed, the pressure of the liquid within the plunger will not act to impede the downward movement of the plunger into its locked position. Any hydraulic lock which would otherwise be occasioned by such liquid under pressure, is therefore avoided by the air which remains trapped in space 48.

Side wall 13 is likewise spaced inwardly from the wall of the pump cylinder at its lower end to thereby define a second annular space 49 therewith. In the primed pump, this second annular space will contain air when the pump is inverted or tipped past horizontal. And if a return spring is to be provided for the plunger, such a spring 51 extends between bottom wall 12 and a transverse wall 52 which interconnects the piston skirt with plunger 22.

The dispenser according to FIG. 1 may be assembled by the manufacterer by snapping discharge head 24 into retaining collar 19 to fully depress the plunger and to close all seals. The dispenser may then be affixed to a filled container by threading cap 17 on to the container neck. The ultimate user may then slightly rotate the discharge head relative to the retaining collar for unlocking the discharge head prior to pump operation. The discharge head and plunger may then be moved axially outwardly of the dispenser (under the assistance of the return spring, or manually) and the pump may be operated as in any normal manner after priming by reciprocation of the plunger. Each downward stroke of the plunger does not reach the fully depressed position of FIG. 1, but stops short of the intake valve, although even after the pump is primed, the plunger may be depressed to its fullest extent without any hydraulic lock interference by reason of the annular spaces provided near the bottom of the pump cylinder. Also, the air within spaces 48 and 49 will not be dispelled even while the dispenser is lying on its side.

Obviously, many other modifications and variations of the present invention are made possible in the light of the above teachings. For example, the lower end of the plunger may be designed to flair outwardly to engage the upper corner of the cage, or may telescopingly engage an inner wall extended upwardly from wall 44 or may sealingly engage the outer surface of wall 44, without departing from the scope of the invention. It is therefore to be understood that within the scope of the appended claims, the invention may be practiced otherwise than as specifically described.

What is claimed is:

1. A fluid dispensing pump comprising, a pump cylinder having a collar at one end, a plunger reciprocably disposed in said cylinder and having a discharge head at one end outwardly of said collar, said head having a fluid discharge opening, said plunger having a discharge passage extending therethrough and communicating with said opening, check valve means in said cylinder to only permit movement of fluid from an inlet into said cylinder, means acting between said head and said collar for locking said head in a depressed and immobilized position, said valve means including a check valve and a cage surrounding said valve, means on said plunger sealingly engaging a portion of said cage when said head is locked in said depressed and immobilized position, and said cage having an intake port therein disposed outwardly of said engaging means, whereby flow of fluid beyond said engaging means into said discharge passage is prevented with said plunger head in said depressed and locked position.

2. The pump according to claim 1, wherein said plunger comprises a hollow tube and has an annular piston skirt at the opposite end thereof slideably received within said cylinder, said skirt being spaced apart from said tube to define a first annular space therewith, whereby air is trapped in said space during reciprocation of said plunger to thereby prevent any hydraulic lock interfering with the locking of said head in said fully depressed and immobilized position.

3. The pump according to claim 2, wherein said valve means extends inwardly from the opposite end of said cylinder and is spaced apart from said cylinder to define a second annular space therewith for additionally trapping air when operating in a horizontal position.

4. The pump according to claim 1, 2 or 3, wherein said cage comprises a transverse wall and a cylindrical side wall containing said intake port, said engaging means comprising an annular lip seal on said plunger in telescoping engagement with said cage side wall when said head is locked in said depressed and immobilized position.

* * * * *